3,034,990
DOUBLY FIRED ELECTROLUMINESCENT PHOSPHORS AND METHOD FOR THEIR PREPARATION

Robert Ellis Wayrynen, Little Silver, N.J., assignor to E. I. du Pont de Nemours and Company, Wilmington, Del., a corporation of Delaware
No Drawing. Filed Dec. 11, 1958, Ser. No. 779,522
7 Claims. (Cl. 252—301.6)

This invention relates to a method of preparing electroluminescent phosphors and to the phosphors so prepared. more specifically it relates to the preparation of metal-activated electroluminescent phosphors with improved emission brightness by a double firing procedure.

Electroluminescent phosphors are commonly prepared by firing pure zinc sulfide in the presence of coactivators and a halide flux compound. It is well known, however, that by this procedure appreciable amounts of the coactivating metal, e.g., lead, frequently used in the preparation of electroluminescent phosphors, are lost during the firing. Appreciable amounts of halide flux, e.g., chloride, are also lost, and since the boiling point of lead chloride is 954° C., i.e., comparable to the firing temperature used, it is believed the loss of the coactivator and flux is due to the lead chloride boiling off. The boiling points of the chlorides of other coactivators are as follows: arsenous chloride, 130° C.; antimony chloride, 220° C.; and bismuth chloride, 447° C. The content of the activator metals is difficult to control when the low boiling chlorides are present.

It is an object of this invention to provide a method for preparing electroluminescent phosphors with improved emission brightness. Another object is to provide a method for preparing electroluminescent phosphors by a double firing technique. A further object is to provide a method for preparing metal-activated electroluminescent phosphors with better control of the activator compounds. A still further object of this invention is to provide a method for preparing metal-activated electroluminescent phosphors without substantial loss of the metal activators during firing. Another object of this invention is to provide metal-activated electroluminescent phosphors with improved emission brightness. Other objects will appear hereinafter.

These and other objects are accomplished by the present invention which embodies a method for preparing an electroluminescent phosphor which comprises mixing one or more chloride-free zinc compounds selected from the group consisting of zinc sulfide and zinc selenide with 0.00001 to 0.01 gram atom per mole of zinc compound of an activator selected from the group consisting of arsenic, antimony, bismuth and lead-containing activators, firing the mixture at a temperature of from 600° C. to 1050° C. for a period of from ½ to 10 hours, subsequently adding thereto 0.0001 to 0.05 gram atom of copper per mole of zinc compound, 1–10% of halide flux compound based on the weight of zinc compound and refiring at a temperature of from 600° C. to 1050° C. for a period of from ½ to 10 hours.

As an exemplary procedure, the improved electroluminescent phosphors are prepared by firing a mixture of pure zinc sulfide and an activator, selected from the group consisting of arsenic, antimony, bismuth, and lead (0.001 gram-atom per mole of zinc sulfide) at a temperature of 850 to 1000° C. for from 1 to 3 hours. After cooling and grinding, the phosphor material is mixed with a copper activator compound (0.0005 to 0.01 gram atom of copper per mole of zinc sulfide) and a halide flux, preferably NaCl (about 1% by weight) and fired as indicated above for the same time period. Upon cooling, the phosphor is washed with aqueous solutions by procedures known in the art, dried and sieved.

Example I

Fifty-eight and four-tenths grams of pure zinc sulfide (i.e. essentially free from metal impurities and metal halides) was mixed with 12 ml. of a 0.025 molar solution of $As_2O_5$ and sufficient pure water to effect thorough mixing by stirring. The mixture was dried, ground in a mortar, and then fired at 850° C. for 3 hours in a covered crucible surrounded by zinc sulfide in a larger, outer crucible. After the firing the material emitted weak, pale blue luminescence under 3650 A. excitation. The powder was ground in a mortar and 19.5 grams of it was then mixed thoroughly with 40 ml. of a 0.050 molar cupric acetate solution and 1.95 ml. of a 1.75 molar sodium chloride solution. The mixture was dried, ground in a mortar and fired at 1000° C. for 2 hours in a covered crucible surrounded by zinc sulfide as previously described. After cooling, the phosphor was washed with a potassium cyanide solution (1.5 g./100 ml. water), washed with water, dried and sieved through a 200-mesh screen. The phosphor so prepared emitted green light when subjected to conditions producing electroluminescence and had essentially no afterglow.

A test was made to determine the brightness of the phosphor when excited to electroluminescence. A cell was prepared by mixing 0.5 gram of the phosphor with 1.9 ml. of a urea formaldehyde (2 parts by weight)-alkyd resin (1 part by weight), which is a clear, thermosetting resin, spreading the mixture on a piece of transparent, electroconductive glass which had a masked out area where one electrical contact was made, and drying the spread mixture in an oven for 30 minutes at 90° C. (prior to drying in the oven the tape masking out the electrical contact area was removed). The resultant cell had 15 mgs. of phosphor per square centimeter and a dry thickness of 8 mils. A silver electrode was then painted on the phosphor surface using metallic silver paint and leaving an unpainted margin at least ⅛ inch from the edges. The cell was again baked at 90° C. but for 10 minutes. Measurements were made of the light output at an applied field of 1000 cycles per second and 150 volts/mil. A brightness of 58 foot-lamberts was obtained.

Example II

Twenty-nine and two-tenths grams of pure zinc sulfide described in Example I was mixed with 0.0306 gram of $Sb_2O_3$ by grinding in a mortar. The mixture was fired at 900° C. for 2 hours in a covered crucible surrounded by zinc sulfide as described in Example I. Twenty-four and three-tenths grams of the first material was mixed by stirring with 12.5 ml. of a 0.20 molar solution of cupric acetate and 4.86 ml. of 1.75 molar sodium chloride. The mixture was dried, ground in a mortar, and fired at 1000° C. for 2 hours in a covered crucible surrounded by zinc sulfide as described in Example I. The fired phosphor was washed, dried and sieved as described in Example I. The electroluminescence of the phosphor was yellow-green and when tested for brightness as described in Example I at 180 volts per mil and 1000 cycles per second, a brightness of 46 foot-lamberts was obtained.

Example III

Twenty-nine and two-tenths grams of pure zinc sulfide previously described was mixed with 15 ml. of a 0.010 molar solution of bismuth nitrate and sufficient pure water to effect thorough mixing by stirring. The mixture was dried, ground in a mortar, and fired at 850° C. for 3 hours as described in Example I. The fired material was ground in a mortar and 24.3 grams of it was mixed with 12.5 ml. of 0.20 molar cupric acetate and 2.43 ml. of 1.75 molar sodium chloride. The resultant mixture was dried, ground in a mortar and fired at 950° C. for 2 hours in a covered crucible surrounded by zinc sulfide as described in Example I. The phosphor was washed, dried, and sieved as in Example I. The electroluminescence of the phosphor was green and when tested for brightness as described in Example I a brightness of 37 foot-lamberts was obtained.

*Example IV*

Twenty-nine and two-tenths grams of pure zinc sulfide previously described was mixed with 6 ml. of 0.050 molar lead acetate solution and sufficient pure water to effect thorough mixing by stirring. The mixture was dried, ground in a mortar, and fired at 975° C. for 2 hours in a covered crucible surrounded by zinc sulfide as described in Example I. The fired mixture was ground in a mortar and 24.3 grams of it was mixed by stirring with 6.25 ml. of 0.20 molar cupric acetate, 2.43 ml. of 1.75 molar sodium chloride and sufficient water for thorough mixing. The mixture was dried, ground in a mortar and fired at 975° C. for 2 hours as previously described. The phosphor was then washed with an aqueous potassium cyanide solution, dried and sieved all as described in Example I. The electroluminescence of the phosphor was green and when tested for brightness as described in Example I a brightness of 74 foot-lamberts was obtained.

*Example V*

Twenty-nine and two-tenths grams of pure zinc sulfide described in Example I were mixed with 18 ml. of a 0.050 molar solution of lead acetate and sufficient pure water to effect thorough mixing by stirring. The mixture was dried, ground in a mortar and fired as described in Example IV. The fired mixture was ground in a mortar and 24.3 grams of it mixed with 2.5 ml. of 0.050 molar cupric acetate and 1.22 ml. of 1.75 molar sodium chloride and sufficient water for thorough mixing. The mixture was dried, ground in a mortar, and fired as described in Example IV, after which the resultant phosphor was washed with a potassium cyanide solution, and dried and sieved all as described in Example I. The electroluminescence of the phosphor was greenish-blue and when tested for brightness as described in Example I a brightness of 20 foot-lamberts was obtained.

The invention process is useful in preparing zinc sulfide electroluminescent phosphors of improved brightness and is also useful in preparing improved zinc sulfoselenide and zinc selenide phosphors.

The invention, as stated above, consists of two firings. In the first, the pure zinc sulfide, zinc selenide or mixtures thereof (essentially free from metal halides, metal impurities and other contaminants) is mixed with an activator, selected from the group consisting of arsenic, antimony, bismuth, and lead. This firing is done at a temperature range of from 600 to 1050° C. for from ½ to 10 hours, but preferably at a temperature of from 850 to 1000° C. for from 1 to 3 hours. The firing is generally done in a zinc sulfide surround for small quantities, but other methods known to the art may be used to prevent the phosphor from becoming contaminated by oxygen etc. (e.g. a nitrogen atmosphere). In the second firing a copper activator and a flux compound, e.g., sodium chloride, are mixed with the phosphor material and the mixture fired at the temperatures and time periods indicated for the first firing. The firing is done in a protective system as previously described.

The copper activator and the activator selected from the group consisting of arsenic, antimony, bismuth, and lead may be added either as a solution of a soluble compound or as a solid compound which is dry blended. The particular activator compounds used are not critical and nearly any sufficiently pure compound may be used. Cupric acetate has been described in the examples, but other copper salts such as the chloride or sulfate can be used. Arsenic trioxide and pentoxide, antimony trioxide and pentoxide, bismuth trioxide, bismuth nitrate, lead carbonate, and lead acetate are examples of activator compounds useful in the first firing. Chlorides of course cannot be used in the first firing since it is essential that the firing be chloride-free. The chloride flux compounds are used with the copper activator in the second firing. Useful flux compounds, in addition to the preferred sodium chloride, are ammonium chloride and potassium chloride. Other halides such as bromide and iodide may also be used but chlorides are preferred. Mixtures of two or more of said halides can be used.

The mixture after the first firing usually has only weak photoluminescence and the material is not considered satisfactory as a phosphor. After activating the intermediate with copper and flux, and firing, however, the resultant phosphor possesses superior electroluminescence.

The method of this invention has the advantage that it can be carried out with the conventional equipment of a phosphor manufacturer. It is relatively simple to carry out and leads to improved electroluminescent phosphors.

The double-fired electroluminescent phosphors provided by this invention can be used for the purposes that the known electroluminescent phosphors are used. The improved phosphors provided by the invention are extremely bright, however, and are especially useful because of this characteristic. Some of the uses for these electroluminescent phosphors include: incorporation in an electroluminescent lamp like that described in U.S. Patent 2,566,349 to Mager and in an X-ray image intensifier of the type described in U.S. Patent 2,650,310 to White. The improved phosphors are also useful in the manufacture of illuminated dials, markers and indicators; advertising devices, dark room lighting; two dimensional television screens; light amplifiers, storage devices for digital computers; radar screens, electro-optical energy convertors; for reproduction of self-luminous halftones; and with a phosphor of complementary color to form a white blend where it is desired that a white emission be obtained.

The electroluminescent phosphors of this invention are significantly brighter than comparable phosphors prepared by previously known methods. In addition, because the first firing is carried out in the absence of metal chlorides better control of the activator compounds, e.g., arsenic, antimony, bismuth, and lead, the chlorides of which are volatile, is obtained.

As many apparently widely different embodiments of this invention may be made without departing from the spirit and scope thereof, it is to be understood that this invention is not limited to the specific embodiments thereof except as defined in the appended claims.

What is claimed is:

1. A method for preparing an electroluminescent phosphor which comprises mixing at least one pure, chloride-free zinc compound selected from the group consisting of zinc sulfide and zinc selenide with 0.00001 to 0.01 gram atom per mole of zinc compound of a chloride-free activator selected from the group consisting of arsenic, antimony, bismuth and lead containing activators, firing this mixture at a temperature of from 600° C. to 1050° C. for a period of from ½ to 10 hours, subsequently adding thereto 0.0001 to 0.05 gram atom of copper per mole of zinc compound, 1 to 10% of halide flux compound based on the weight of zinc compound and refiring at a temperature of from 600° C. to 1050° C. for a period of from ½ to 10 hours.

2. A method for preparing an electroluminescent phosphor which comprises mixing a pure, chloride-free zinc sulfide with 0.00001 to 0.01 gram atom per mole of zinc compound of a chloride-free activator selected from the group consisting of arsenic, antimony, bismuth and lead containing activators, firing this mixture at a temperature of from 850° C. to 1000° C. for a period of from 1 to 3 hours, subsequently adding thereto 0.0005 to 0.01 gram atom of copper per mole of zinc sulfide, 1 to 10% of a halide flux based on the weight of zinc sulfide and refiring at a temperature of from 850° C.–1000° C. for a period of from 1 to 3 hours.

3. The method of claim 2 wherein the halide flux is NaCl.

4. The method of claim 2 wherein the activator is an arsenic activator.

5. The method of claim 2 wherein the activator is an antimony activator.

6. The method of claim 2 wherein the activator is a bismuth activator.

7. The method of claim 2 wherein the activator is a lead activator.

References Cited in the file of this patent
UNITED STATES PATENTS

| | | |
|---|---|---|
| 2,774,739 | Butler | Dec. 18, 1956 |
| 2,802,792 | Butler | Aug. 13, 1957 |